United States Patent
Li et al.

(10) Patent No.: US 12,230,014 B2
(45) Date of Patent: Feb. 18, 2025

(54) USER-GUIDED IMAGE GENERATION

(71) Applicant: ADOBE INC., San Jose, CA (US)

(72) Inventors: Yijun Li, Seattle, WA (US); Utkarsh Ojha, Madison, WI (US); Richard Zhang, San Francisco, CA (US); Jingwan Lu, Sunnyvale, CA (US); Elya Shechtman, Seattle, WA (US); Alexei A. Efros, San Jose, CA (US)

(73) Assignee: ADOBE INC., San Jose, CA (US)

( * ) Notice: Subject to any disclaimer, the term of this patent is extended or adjusted under 35 U.S.C. 154(b) by 366 days.

(21) Appl. No.: 17/680,906

(22) Filed: Feb. 25, 2022

(65) Prior Publication Data
US 2023/0274535 A1 Aug. 31, 2023

(51) Int. Cl.
G06V 10/774 (2022.01)
G06F 3/04842 (2022.01)

(52) U.S. Cl.
CPC ...... *G06V 10/7747* (2022.01); *G06F 3/04842* (2013.01)

(58) Field of Classification Search
CPC .................. G06V 10/7747; G06F 3/04842
See application file for complete search history.

(56) References Cited

U.S. PATENT DOCUMENTS

| | | | |
|---|---|---|---|
| 2018/0039879 A1* | 2/2018 | Shaji | G06N 3/082 |
| 2020/0242771 A1* | 7/2020 | Park | G06T 11/001 |
| 2021/0097395 A1* | 4/2021 | Ocher | G06N 3/063 |
| 2023/0214579 A1* | 7/2023 | Somech | G06N 3/0455 |
| | | | 715/271 |

* cited by examiner

*Primary Examiner* — John R Wallace
(74) *Attorney, Agent, or Firm* — Shook, Hardy & Bacon L.L.P.

(57) ABSTRACT

An image generation system enables user input during the process of training a generative model to influence the model's ability to generate new images with desired visual features. A source generative model for a source domain is fine-tuned using training images in a target domain to provide an adapted generative model for the target domain. Interpretable factors are determined for the source generative model and the adapted generative model. A user interface is provided that enables a user to select one or more interpretable factors. The user-selected interpretable factor(s) are used to generate a user-adapted generative model, for instance, by using a loss function based on the user-selected interpretable factor(s). The user-adapted generative model can be used to create new images in the target domain.

20 Claims, 6 Drawing Sheets

USER-GUIDED IMAGE GENERATION

BACKGROUND

Generative models have been developed that can create new images that appear realistic. For example, generative adversarial networks (GANs) are generative deep learning approaches that have proven to be particularly adept at generating new images. Typically, a generative model is trained or fine-tuned on training images from a given domain in order to generate images in that domain. For instance, a generative model can be trained on a collection of human faces in order to generate new images of human faces. While such generative models are able to produce realistic images, it is difficult to control particular visual features of the images, such as a person's mouth in images of human faces (e.g., smiling closed mouth, smiling with teeth showing, frowning, etc.). When trained on a large number of images with varying visual features, a generative model will be able to produce images that exhibit some level of variation in those features, although the range of variations can still be somewhat limited. In some cases, only a small set of training images is available for training a generative model. This is referred to as a "few-shot" scenario when a generative model is trained using a small set of training images. In the case of a generative model generated from a few-shot approach, the range of variations in visual features of images generated by the model is even further limited.

SUMMARY

Embodiments of the present invention relate to, among other things, an image generation system that enables user input when training a generative model to influence the generative model's ability to generate new images with desired visual features. A source generative model that produces images in a source domain is fine-tuned using training images in a target domain to provide an adapted generative model that produces images in the target domain. Interpretable factors are determined for the source generative model and the adapted generative model. A user interface is provided that enables a user to select one or more of the interpretable factors. The user-selected interpretable factor(s) are used to generate a user-adapted generative model. For instance, a loss function can be used to minimize a distance between the user-selected interpretable factor(s) for the source generative model and the user-adapted generative model. The user-adapted generative model can be used to create new images in the target domain.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
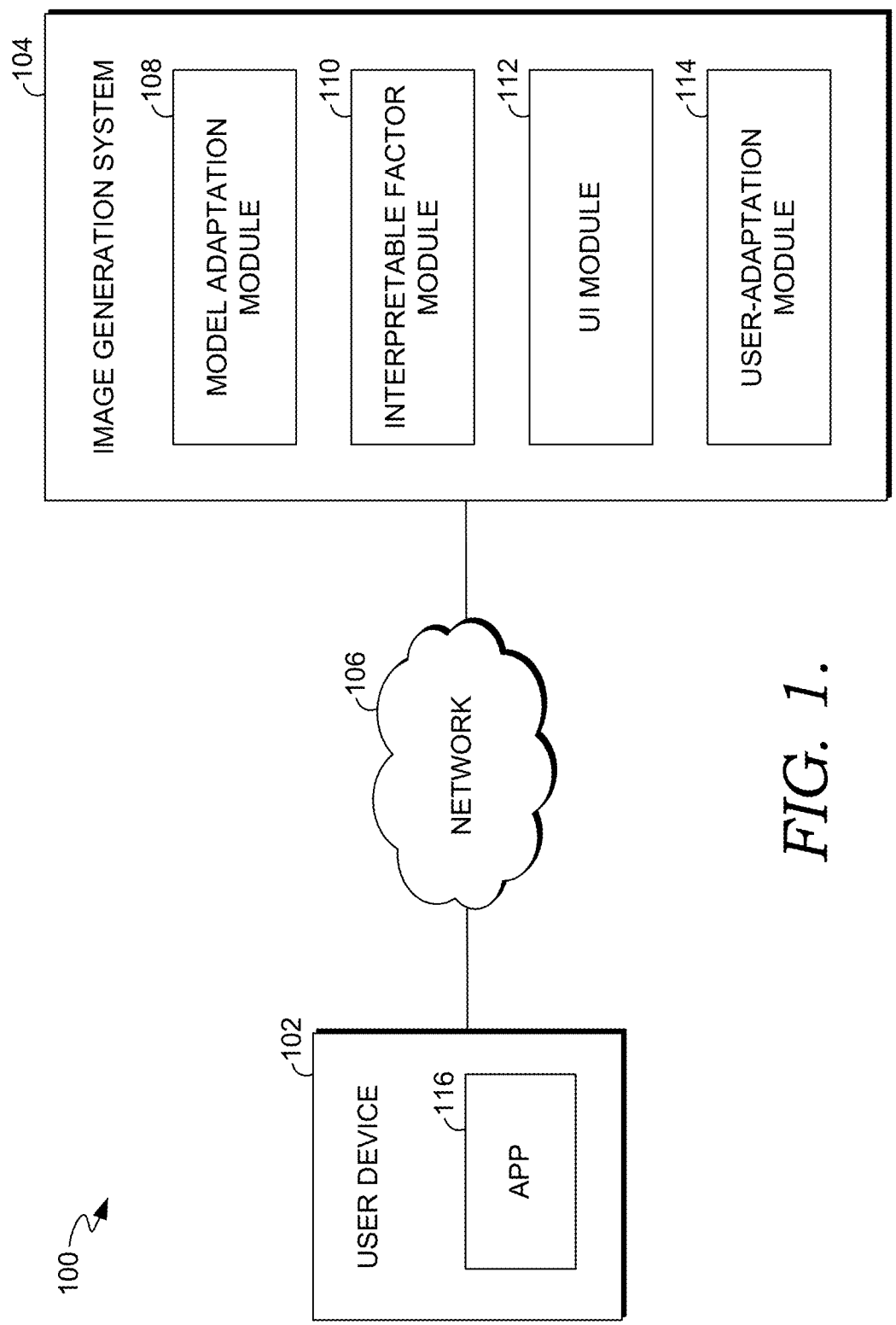
FIG. 1 is a block diagram illustrating an exemplary system in accordance with some implementations of the present disclosure.

Generative models, such as generative adversarial networks (GANs), can produce realistic images within given domains. However, there are some limitations in the ability to control visual features of images generated by the models. While there are some aspects of stochasticity while training generative models (random seed, initialization, dataset order), the resulting variations from the models are not that large even in the case of a training dataset with images having a large range of variations in visual features. The resulting variations are further limited when only a small set of training images having few variations is used (i.e., a "few-shot" scenario). More importantly, the variations, however small or big, are outside the control of a human. In other words, there is no straightforward way for a human to induce desired preferences for visual features of the images, apart from hoping that a source of randomness introduces a desired change. However, different users may wish for a generative model to express visual features in different ways. For example, consider the domain of face caricatures: for user A, the desired outcome could be newly-generated caricatures with a big laughing face. For user B, the desired attributes could include only slightly smiling faces.

Embodiments of the present invention solve these problems by providing an image generation system that enables user input during the process of generating a generative model to thereby influence the ability of the generative model to produce images with desired visual features. As will be described in further detail herein, aspects of the technology described herein allow for user preferences to be distilled into the learning process of a generative model. The process involves exposing interpretable factors in a generative model to a user and allowing the user to select one or more of the interpretable factors such that the chosen interpretable factors are preserved in the training process.

In accordance with some aspects of the technology described herein, a source generative model able to generate new images in a source domain is received. Training images from a target domain are also received. For instance, the source domain can comprise images of natural human faces, while the target domain can comprises sketches of human faces. The source generative model is fine-tuned using the training images to produce an adapted generative model able to generate images in the target domain (e.g., sketches of human faces). Interpretable factors for the source generative model and the adapted generative model are identified. An interpretable factor comprises a direction (e.g., internal representation) in the latent space of a generative model that corresponds with one or more human-recognizable features in images generated by the generative model. For instance, in the case of a generative model that creates images of human faces, interpretable factors can correspond with various visual features of the human faces, such as head size, amount of hair, mouth, etc.

A user interface is provided that exposes the interpretable factors to a user. For instance, a user interface could be provided that presents images from the source generative model and the adapted generative model corresponding with each interpretable factor. This allows the user to view how the interpretable factors impact visual features in the two generative models. The user selects one or more of the interpretable factors based on desired attributes. A user-adapted generative model is then generated based on the user-selected interpretable factor(s). In some aspects, a loss function is used in the training process that minimizes a distance between each selected interpretable factor for the source generative model and the user-adapted generative model. This causes the user-adapted generative model to better preserve the visual feature(s) associated with the selected interpretable factor(s). The user-adapted generative model can then be used to generative new images in the target domain that exhibit visual characteristics influenced by the user-selected interpretable factor(s).

The technology described herein provides a number of advantages over existing approaches. For instance, aspects of the technology described herein allow for user input to influence the training process of a generative model. As a result, a trained generative model can produce images that better exhibit visual features important to the user. While this technique is applicable to adaptation processes using any number of training images (including large datasets), the technology is particularly advantageous in few-shot scenarios in which the limited number of training images typically limits the diversity of visual features in the generative model resulting from the training process.

Example System for User-Guided Image Generation

With reference now to the drawings, FIG. 1 is a block diagram illustrating an exemplary system 100 for user-guided image generation in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image generation system 104. Each of the user device 102 and image generation system 104 shown in FIG. 1 can comprise one or more computer devices, such as the computing device 700 of FIG. 7, discussed below. As shown in FIG. 1, the user device 102 and the image generation system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and servers can be employed within the system 100 within the scope of the present invention. Each can comprise a single device or multiple devices cooperating in a distributed environment. For instance, the image generation system 104 could be provided by multiple server devices collectively providing the functionality of the image generation system 104 as described herein. Additionally, other components not shown can also be included within the network environment.

At a high level, the image generation system 104 enables the training process for a generative model to incorporate user input that influences visual features of images producible by the resulting generative model. As shown in FIG. 1, the image generation system 104 includes a model adaptation module 108, an interpretable factor module 110, a user interface (UI) module 112, and a user-adaptation module 114. These components can be in addition to other components that provide further additional functions beyond the features described herein.

The image generation system 104 can be implemented using one or more server devices, one or more platforms with corresponding application programming interfaces, cloud infrastructure, and the like. While the image generation system 104 is shown separate from the user device 102 in the configuration of FIG. 1, it should be understood that in other configurations, some or all of the functions of the image generation system 104 can be provided on the user device 102.

Given a source generative model and training images in a target domain, the model adaptation module 108 generates an adapted generative model by fine-tuning the source generative model using the training images. The adapted generative model is able to generate images in the target domain, which differs from images in the source domain for the source generative model. For instance, the source generative model may have been trained to generate images of real human faces, while the adapted generative model may be fine-tuned to generate sketches of human faces.

The model adaptation module 108 can employ any of a variety of techniques for fine-tuning a source generative model to provide an adapted generative model using training images. In some instances, the training images can be low (e.g., less than 50 images or less than 10 images), and the model adaptation module 108 employs a few-shot adaptation process. The source generative model can be any type of model that generates new images. By way of example only and not limitation, the source generative model can be a generative adversarial (GAN) model. In some cases, the source generative model is pre-trained on a large-scale dataset (e.g., FFHQ/ImageNet). The model adaptation module 108 fine-tunes the source generative model using training images to adapt the source generative model to a new domain, thereby providing an adapted generative model. The process can employ one or more loss functions to generate the adapted generative model. The set of loss functions used in this adaptation process is referred to herein as $L_{adapt}$.

By way of example only and not limitation, in some instances, the model adaptation module 108 can employ a method that introduces new parameters to discover relevant regions in the latent space useful for fine-tuning. In other instances, the model adaptation module 108 can employ a method that introduces the idea of importance of parameters and attaches a constraint which penalizes changes in the parameters during adaptation in proportion of their importance. As another example, the model adaptation module 108 can employ a method that preserves a correspondence between the source domain and the adapted domain, which can help preserve diversity, for instance, in the few-shot scenario.

Figure 2:
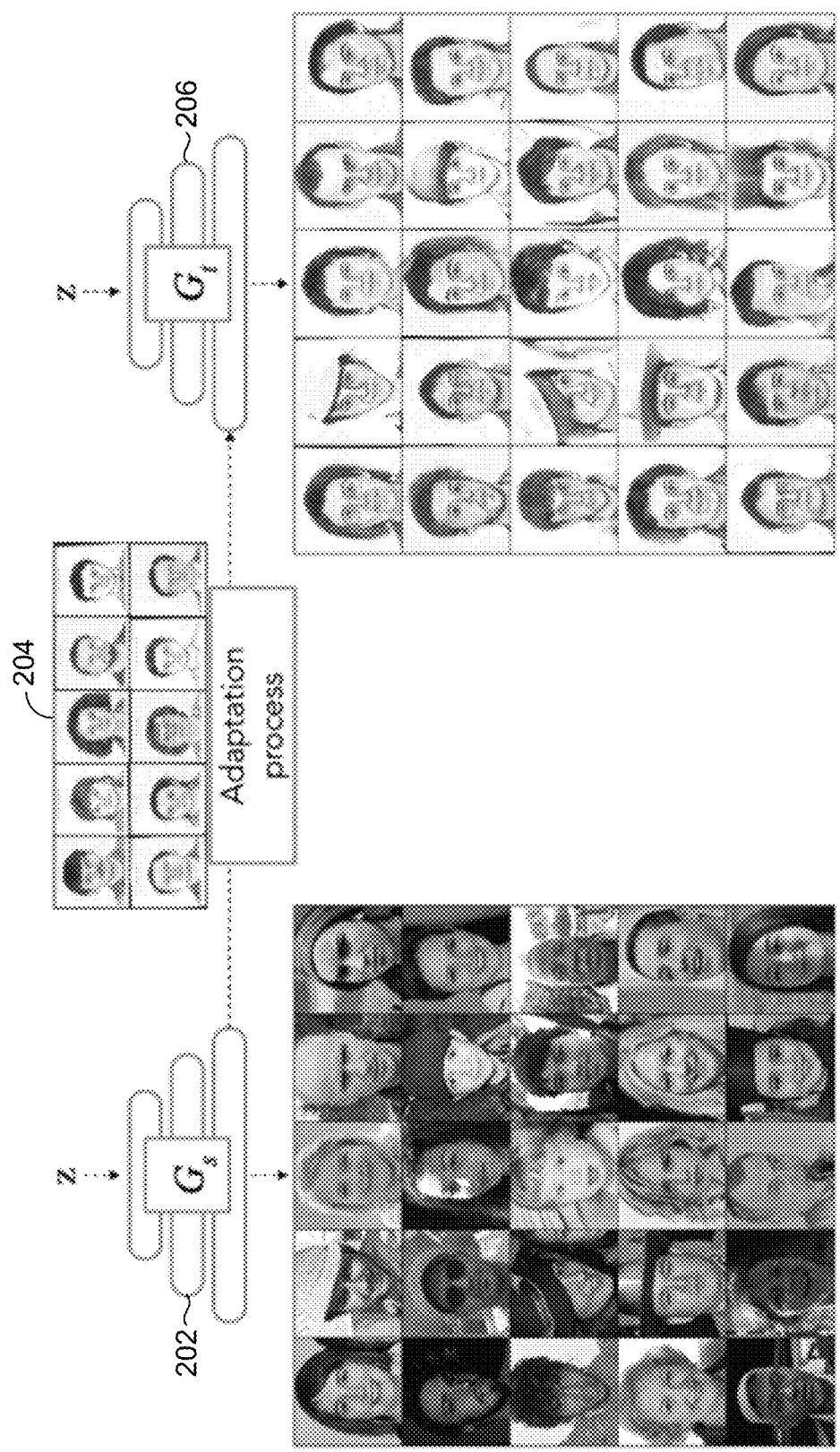
FIG. 2 is a diagram showing fine-tuning a source generative model with training images to generate an adapted generative model in accordance with some implementations of the present disclosure.

FIG. 2 provides a block diagram showing an example of adapting a source generative model to a target domain. As shown in FIG. 2, the adaptation process starts with a source generative model 202 ($G_s$), which can generate diverse images is a source domain. In this example, the source domain comprises images of natural human faces. Using training images 204 for a target domain, the adaptation process fine-tunes the source generative model 202 to generate an adapted generative model 206 ($G_t$). The training images 204 in this example are from a target domain of sketches of human faces. Additionally, in this example, only 10 training images are available, presenting a few-shot scenario. The adapted generative model 206 resulting from the adaptation process can generate images with some diversity similar to the source generative model 202. However, the adapted generative model generates images in a target domain comprising sketches of human faces, as opposed to the source domain comprising natural human faces.

Referring again to FIG. 1, the interpretable factor module 110 identifies interpretable factors in a source generative model and an adapted generative model generated from the source model. Each interpretable factor comprises a direction (e.g., internal representation) in the latent space of a generative model that corresponds with one or more human-recognizable features in images generated by the model. For instance, in the case of a generative model for generating images of human faces, one interpretable factor can correspond with aspects of the mouth on generated faces (e.g., smiling, frowning, etc.), while another interpretable factor can correspond with aspects of hair on generated faces (e.g., fullness, color, etc.). In some cases, an interpretable factor can correspond with multiple human-recognizable features.

The interpretable factor module 110 can use a supervised or an unsupervised method for identifying interpretable factors for a source generative model and an adapted generative model. By way of example only and not limitation, in some configurations, the interpretable factor module 110 uses an unsupervised method that takes a weight matrix (W) transforming a noise vector to feature space in a generative model, and performs a singular value decomposition of the weight matrix as follows:

$$W = U \Sigma V^T$$

where columns of U denote important properties of this transformation in descending order.

Using this approach, weights of the source generative model ($W_s$) provide the source model interpretable factors ($F_s$), and weights of the adapted generative model ($W_t$) provide the adapted model interpretable factors ($F_t$):

$$W_s = U_s \Sigma_s V_s^T$$

$$W_t = U_t \Sigma_t V_t^T$$

The interpretable factor module 110 determines corresponding interpretable factors for the source generative model and the adapted generative model. For instance, in a configuration in which interpretable factors correspond to columns of U, an interpretable factor for the first column of the source generative model $U_s^1$ corresponds to an interpretable factor for the first column of the adapted generative model $U_t^1$. As will be described in further detail below, this correspondence allows a user-adapted generative model to be generated based on one or more user-selected interpretable factors such that each selected interpretable factor is better preserved from the source interpretative model in the user-adapted generative model.

The interpretable factors are presented to a user to allow the user to guide the process of generating a user-adapted generative model using interpretable factors that are important to the user. To facilitate this process, the user interface (UI) module 112 provides one or more user interfaces for interacting with the image generation system 104. In accordance with the technology described herein, the UI module 112 provides one or more user interfaces that expose the interpretable factors for the source generative model and the adapted generative model to the user and allows the user to select one or more interpretable factors for generating a user-adapted generative model. For instance, the UI module 112 can provide user interfaces to a user device, such as the user device 102. The user device 102 can be any type of computing device, such as, for instance, a personal computer (PC), tablet computer, desktop computer, mobile device, or any other suitable device having one or more processors. As shown in FIG. 1, the user device 102 includes an application 116 for interacting with the image generation system 104. The application 116 can be, for instance, a web browser or a dedicated application for providing functions, such as those described herein. Among other things, the application 116 can present the user interfaces provided by the UI module 112.

Figure 3:
FIG. 3 is diagram showing an example visualization for presenting interpretable factors on a user interface in accordance with some implementations of the present disclosure.

A user interface provided by the UI module 112 can expose interpretable factors to a user in a number of different ways. In some configurations, the UI module 112 provides a user interface with a visualization of interpretable factors and user interface elements that allow a user to select one or more the interpretable factors. For instance, a user interface can be provided with images from the source generative model and the adapted generative model corresponding with each of the interpretable factors determined by the interpretable factor module 110. By way of illustration, FIG. 3 presents a visualization 300 of the discovered interpretable factors as a series of images from each of a source generative model and an adapted generative model. In the example of FIG. 3, the top row 302 is a series of images generated by the source generative model, and the bottom row 304 is a series of images generated by the adapted generative model. Each column corresponds with a different interpretable factor discovered by the interpretable factor module 110.

A user can select one or more interpretable factors by selecting one or more of the columns from the visualization 300. Any selected interpretable factors are then used to generate a user-adapted model, as will be described in further detail below. For example, the user viewing the visualization 300 may see that an interpretable factor corresponding with a particular column is reducing the head size of the face and growing more hair in the image from the source generative model. However, the same interpretable factor is not introducing the same change as effectively in the adapted generative model. Consequently, if the user desires more variations in the head size and amount of hair in a user-adapted generative model, then the user can select this interpretable factor, which can be prioritized during the process of generating the user-adapted generative model.

FIG. 3 provides an example of one way of exposing interpretable factors. It should be noted that a variety of different user interfaces can be provided that expose interpretable factors in different manners and with various user interface elements (images, buttons, sliders, etc.) that allow a user to provide input associated with the interpretable factors for generating a user-adapted generative model.

The user-adaptation module 114 generates a user-adapted generative model based on one or more interpretable factors selected by a user via a user interface from the UI module 112. In some aspects, the user-adaptation module 114 trains a user-adapted generative model using a loss function that minimizes a distance between the interpretable factor(s) for the source generative model and the user-adapted generative model. For instance, the loss function can minimize the cosine distance between the chosen interpretable factors for the models.

In some configurations, the user-adaptation module 114 uses the loss function based on user-selected interpretable factor(s) to further fine-tune the adapted generative model previously generated, thereby creating the user-adapted generative model. In some instances, the user-adaptation module 114 generates the user-adapted generative model without using the previously-generated adapted generative model, for instance, by using an adaptation process such as that described above the for the model adaptation module 108. In any case, the training process employed by the user-adaptation module 114 can use an overall loss function that combines both an adaptation loss similar to that used when training the adapted generative model and the loss based on the user-selected interpretable factor(s):

$$L_{train}=L_{adapt}+L_{user}$$

where $L_{train}$ is an overall loss function, $L_{adapt}$ is an adaptation loss function used to adapt from a source domain to a target domain, and $L_{user}$ is a loss function based on user-selected interpretable factor(s).

Figure 5:
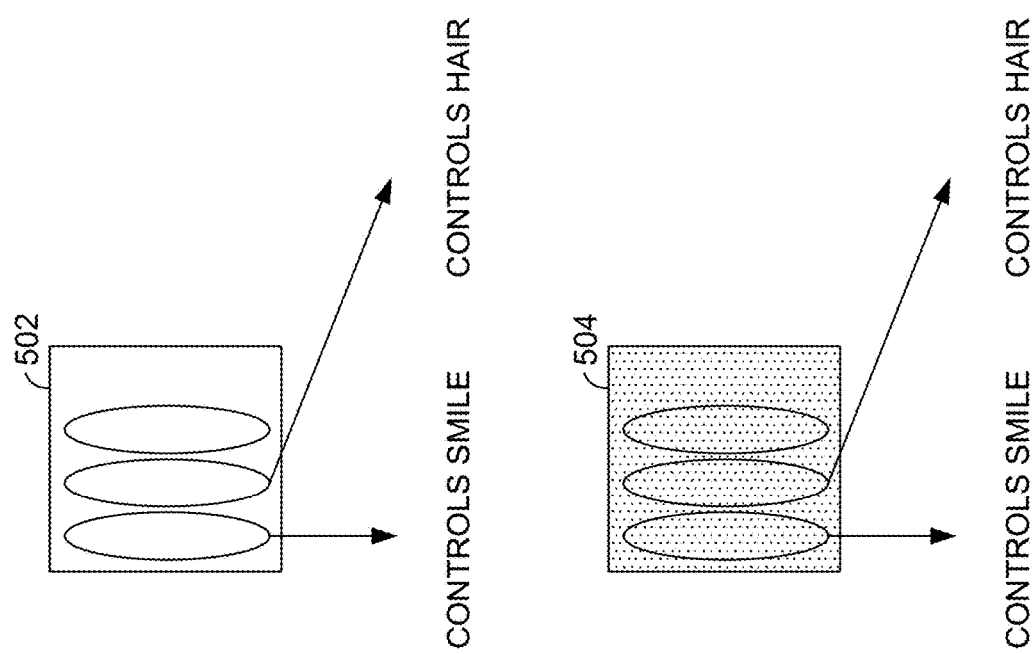
FIG. 5 is a diagram showing corresponding interpretable factors for a source generative model and a target generative model.

By way of example using the approach discussed above in which columns of U matrix are used as the interpretable factors, the objective of the loss function is such that user-selected interpretable factors, specified by the columns of U matrix, remain similar for source and target domains. Suppose the weight matrix (W) is 512×6000. This means that, for each generative model, there are 512 vectors, each of a dimension 6000, representing the interpretable factors for this process. If the user selects the first interpretable factor (e.g., corresponding to smile) and the second interpretable factor (e.g., corresponding with hair), the loss function trains the user-adapted generative model such that $U_s^1$ is similar to $U_t^1$ and $U_s^2$ is similar to $U_t^2$. This is illustrated in FIG. 5, which shows the weights from the source generative model 502 and the user-adapted generative model 504 for the first two columns having similar properties as a result of training using the loss function based on the user-selected interpretable factors. In this example, the loss function based on the user-selected interpretable factors can be represented as follows:

$$L_{user}=\text{distance}(U_s,U_t)$$

where distance in this example is the cosine distance, and $U_s$ and $U_t$ each denote the d interpretable factors chosen by the user in the source generative model and the user-adapted generative model, respectively. In this way, the corresponding singular vectors represent similar properties in the source generative model and the user-adapted generative model.

Figure 4:
FIG. 4 is a diagram showing images generated by a user-adapted generative model in accordance with some implementations of the present disclosure.

After being trained, the user-adapted generative model can be used to generate new images. Because the user-adapted generative model has been trained to optimize user-selected interpretation factor(s), images generated by the user-adapted generative model will exhibit visual features corresponding to the interpretation factor(s) more similar to that of the source domain. By way of example to illustrate using the visualization 300 of FIG. 3, suppose a user determines that the head size and hair of the adapted generative model images 304 do not vary as much as the source generative model images 306. Accordingly, the user selects an interpretable factor that corresponds with face size and hair, and a user-adapted generative model is generated based on these selected interpretable factors. FIG. 4 provides a series of images 402 output by this user-adapted generative model. As can be seen from FIGS. 3 and 4, the user-adapted generative model is able to produce images 402 in which the face size and hair is more diverse then the images 304 produced by the adapted generative model.

In some instances, a user may wish to further refine a user-adapted generative model. As such, the adaptation process can involve multiple iterations in which interpretable factors are exposed to the user at each iteration, and the user-adapted generative model is further trained using any interpretable factors selected at each iteration.

Example Methods for User-Guided Image Generation

Figure 6:
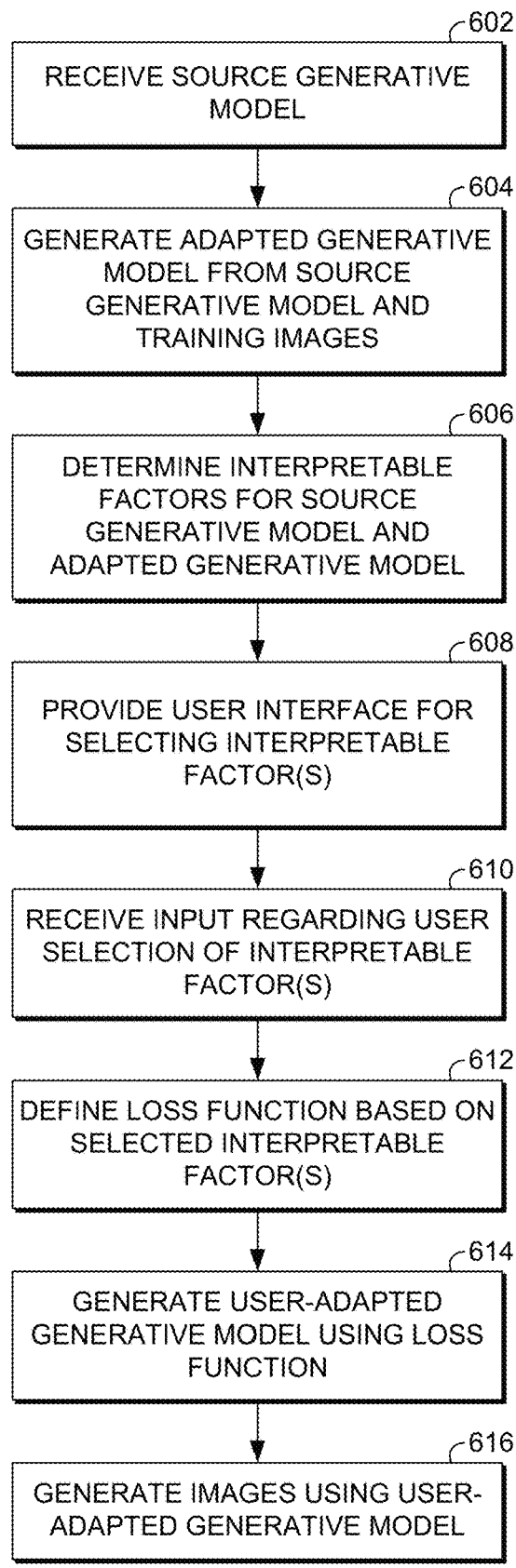
FIG. 6 is a flow diagram showing a method for generating a user-adapted generative model in accordance with some implementations of the present disclosure.

With reference now to FIG. 6, a flow diagram is provided that illustrates a method 600 for generating a user-adapted generative model. The method 600 can be performed, for instance, by the image generation system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, a source generative model is received. The source generative model can be a model, such as a GAN, pre-trained on a large-scale dataset (e.g., FFHQ/ImageNet) to generate images in a particular domain. For instance, in the example of FIG. 2, the source generative model 202 has been trained to generate images of faces.

The source generative model is fine-tuned using a set of training images in a target domain to generate an adapted generative model that generates images in the target domain, as shown at block 604. For instance, in the example of FIG. 2, the source generative model 202 has been fine-tuned with training images 204 comprising sketches of faces to generate the adapted generative model 206 that generates images with sketches of faces. Any of a variety of different adaptation techniques can be employed to generate the adapted generative model from the source generative model at block 604.

Interpretable factors are determined for the source generative model and the adapted generative model, as shown at block 606. The interpretable factors each comprises a direction (e.g., internal representation) in the latent space of the source and adapted generative models that corresponds with one or more human-recognizable features in images generated by the models. The interpretable factors can be determined using a supervised or unsupervised method for discovering interpretable factors for generative models.

As shown at block 608, a user interface is provided with user interface elements allowing for a user to view and select one or more of the interpretable factors identified at block 606. The interpretable factors can be presented by the user interface using any of a number of visualizations. For instance, the user interface can present images generated by the source generative model and adapted generative model, where each image corresponds with an interpretable factor. The user interface allows a user to view aspects of the interpretable factors and provide input selecting one or more of the interpretable factors. Accordingly, user input selecting one or more interpretable factors is received via the user interface, as shown at block 610. For instance, the user can interact with one or more user interface elements of the user interface to select the interpretable factor(s).

A loss function is defined based on the user-selected interpretable factor(s), as shown at block 612. The loss function is intended to minimize a distance between the selected interpretable factor(s) for the source generative model and a user-adapted generative model. For instance, the loss function can be based on a cosine distance between the selected interpretable factor(s) between the two models. The loss function is used to generate the user-adapted generative model, as shown at block 614. Because the loss function minimizes the distance between the selected interpretable factor(s) for the source generative model and the user-adapted generative mode, the user-adapted generative model is able to produce images with visual features corresponding to the selected interpretable factors that are more similar to images from the source domain. The user-adapted generative model is then used to generate new images in the target domain, as shown at block 616.

Exemplary Operating Environment

Figure 7:
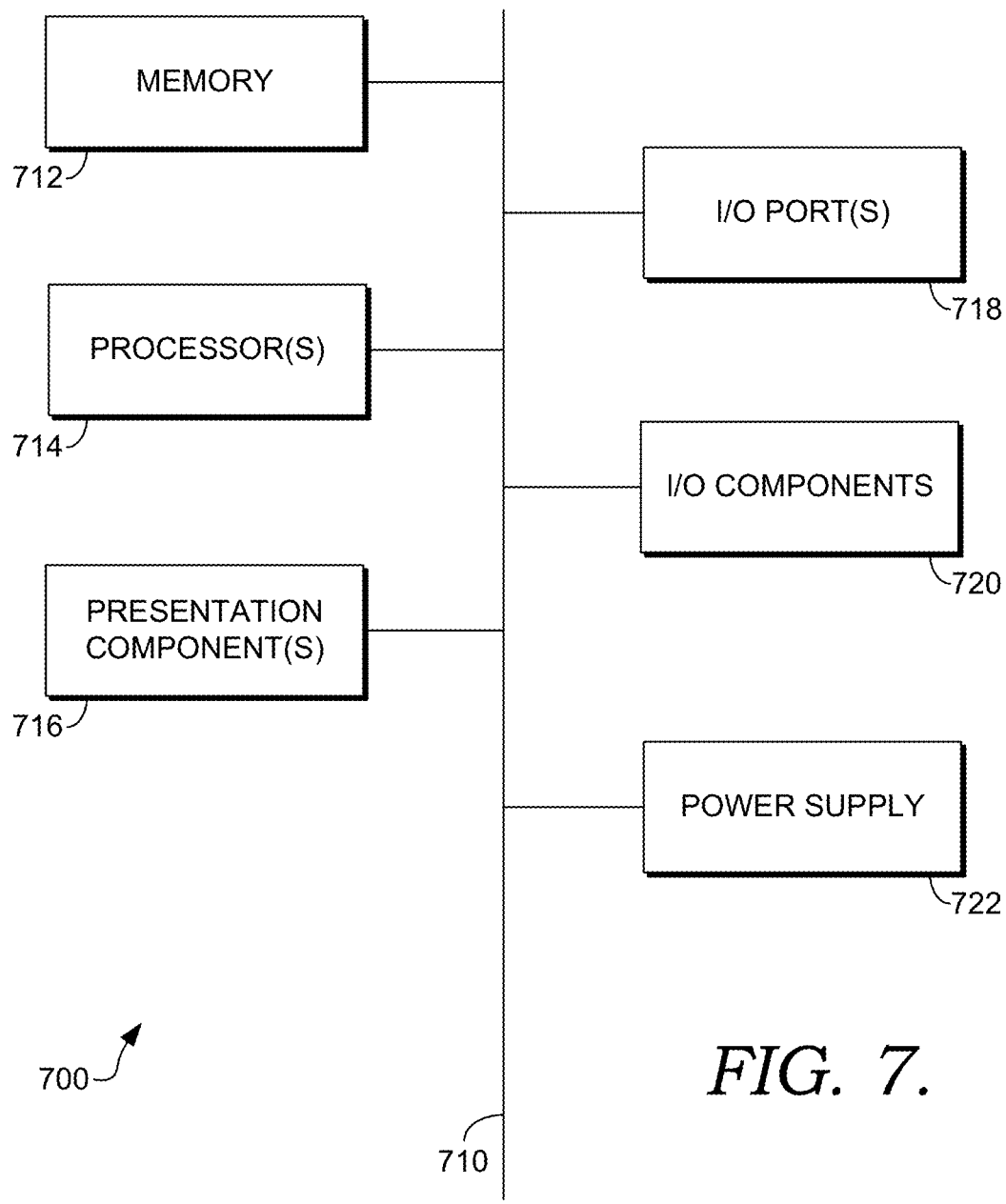
FIG. 7 is a block diagram of an exemplary computing environment suitable for use in implementations of the present disclosure.

Having described implementations of the present disclosure, an exemplary operating environment in which embodiments of the present invention can be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention can be practiced in a variety of system configurations, including hand-held devices, consumer electronics, general-purpose computers, more specialty computing devices, etc. The invention can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention can generally refer to the technical solution environment and the schematics described herein, it is understood that the techniques described can be extended to other implementation contexts.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more non-transitory computer storage media storing computer-useable instructions that, when used by a computing device, cause the computing device to perform operations, the operations comprising:
   training an adapted generative model by fine-tuning a source generative model using a set of training images;
   determining a plurality of interpretable factors for the source generative model and the adapted generative model, each interpretable factor comprising a direction in a latent space of the source generative model and a corresponding direction in a latent space of the adapted generative model;
   providing a user interface that presents user interface elements for selecting one or more of the interpretable factors;
   receiving input indicative of a selection of a first interpretable factor from the plurality of interpretable factors, the first interpretable factor corresponding to a first subset of weights in a weight matrix for the source generative model; and
   training a user-adapted generative model using a loss function based on the selected first interpretable factor, the loss function minimizing a distance between the first subset of weights in the weight matrix for the source generative model and a corresponding first subset of weights in a weight matrix for the user-adapted generative model; and
   generating a new image using the user-adapted generative model.

2. The non-transitory computer storage media of claim 1, wherein the plurality of interpretable factors are determined using an unsupervised method for discovering interpretable factors.

3. The non-transitory computer storage media of claim 2, wherein the interpretable factors for the source generative model are determined based on weights from the weight matrix of the source generative model, and wherein the interpretable factors for the adapted generative model are determined based on weights from a weight matrix of the adapted generative model.

4. The non-transitory computer storage media of claim 1, wherein the user interface presents a first image generated by the source generative model and a second image generated by the adapted generative model, the first image for the first interpretable factor for the source generative model and the second image for a corresponding first interpretable factor for the adapted generative model.

5. The non-transitory computer storage media of claim 4, wherein the input is indicative of a user selection associated with: the first image, the second image, and/or a user interface element associated with the first image and/or the second image.

6. The non-transitory computer storage media of claim 1, wherein the distance comprises a cosine distance.

7. The non-transitory computer storage media of claim 1, wherein generating the user-adapted generative model comprises fine-tuning the adapted generative model using the loss function.

8. A computerized method comprising:
receiving a source generative model for a source domain and a set of training images for a target domain;
adapting the source generative model using the set of training images to provide an adapted generative model for the target domain;
determining a plurality of interpretable factors for the source generative model and/or the adapted generative model, each interpretable factor comprising a direction in a latent space of the source generative model and/or a direction in a latent space of the adapted generative model;
receiving input regarding a user-selected interpretable factor from the plurality of interpretable factors, the user-selected interpretable factor corresponding to a first subset of weights in a weight matrix for the source generative model;
generating a user-adapted generative model for the target domain based on the user-selected interpretable factor by training the user-adapted generative model using a loss function minimizing a distance between the first subset of weights in the weight matrix for the source generative model and a corresponding first subset of weights in a weight matrix for the user-adapted generative model; and
using the user-adapted generative model to generate a new image in the target domain.

9. The method of claim 8, wherein the plurality of interpretable factors are determined using an unsupervised method.

10. The method of claim 8, wherein the input regarding the user-selected interpretable factor is received via a user interface that presents a visualization of at least a portion of the plurality of interpretable factors.

11. The method of claim 8, wherein the distance comprises a cosine distance.

12. The method of claim 8, wherein generating the user-adapted generative model comprises fine-tuning the adapted generative model using the loss function.

13. The computerized method of claim 8, wherein the plurality of interpretable factors comprise one or more interpretative factors for the source generative model determined based on weights from the weight matrix of the source generative model, and/or one or more interpretable factors for the adapted generative model determined based on weights from a weight matrix of the adapted generative model.

14. The computerized method of claim 8, wherein the method further comprises: providing a user interface that presents a first image generated by the source generative model and a second image generated by the adapted generative model, the first image for a first interpretable factor for the source generative model and the second image for a corresponding first interpretable factor for the adapted generative model.

15. The computerized method of claim 14, wherein the input is indicative of a user selection associated with: the first image, the second image, and/or a user interface element associated with the first image and/or the second image.

16. A computer system comprising:
a processor; and
a computer storage medium storing computer-useable instructions that, when used by the processor, causes the computer system to perform operations comprising:
determining a plurality of interpretable factors for a first generative model and a corresponding plurality of interpretable factors for a second generative model adapted based on the first generative model, each interpretable factor comprising a direction in a latent space of the first generative model and a corresponding direction in a latent space of the second generative model;
receiving input regarding a user selection associated with a first interpretable factor for the first generative model, the first interpretable factor corresponding to a first subset of weights in a weight matrix for the first generative model, wherein the input regarding the user selection is received via a user interface that presents a visualization of at least a portion of the plurality of interpretable factors for the first generative model and the corresponding plurality of interpretable factors for the second generative model; and
generating a third generative model based on the user selection by training the third generative model using a loss function minimizing a distance between the first subset of weights in the weight matrix for the first generative model and a corresponding first subset of weights in a weight matrix for the third generative model.

17. The system of claim 16, wherein the third generative model is generated by fine-tuning the second generative model.

18. The system of claim 16, wherein the interpretable factors for the first generative model are determined based on weights from the weight matrix of the first generative model, and wherein the interpretable factors for the second generative model are determined based on weights from a weight matrix of the second generative model.

19. The system of claim 16, wherein the user interface presents a first image generated by the first generative model and a second image generated by the second generative model, the first image for a first interpretable factor for the first generative model and the second image for a corresponding first interpretable factor for the second generative model.

20. The system of claim 19, wherein the input is indicative of a user selection associated with: the first image, the second image, and/or a user interface element associated with the first image and/or the second image.

* * * * *